(No Model.)

R. M. HUNTER.
ELECTRIC RAILWAY.

No. 449,797. Patented Apr. 7, 1891.

WITNESSES:
Henry Drury

INVENTOR:

United States Patent Office.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC RAILWAY.

SPECIFICATION forming part of Letters Patent No. 449,797, dated April 7, 1891.

Application filed December 15, 1888. Serial No. 293,665. (No model.)

*To all whom it may concern:*

Be it known that I, RUDOLPH M. HUNTER, of the city and county of Philadelphia, and State of Pennsylvania, have invented an Improvement in Electric Railways, (Case 76,) of which the following is a specification.

My invention has reference to electric railways; and it consists of certain improvements fully set forth in the following specification, and shown in the accompanying drawings, which form part thereof.

My invention contemplates the employment of a common conduit structure arranged between the two railway-tracks. By this construction the collector is arranged upon the outside of the wheel-base and preferably supported by the axle-boxes or axles and independent of the car-body, which in practice is supported on springs. The conduit may have one or two slots and one or two pairs of conductors, which may be insulated from the conduit; or, if preferred, one of the conductors may be electrically connected with the conduit and track. It is immaterial to my invention whether the conduit has more than one slot and more than one conductor, though I prefer it to be made with two slots and two pairs of conducting-surfaces. In this connection I find it desirable to arrange the slots of the conduit at the highest parts of the road-bed and let the tracks slope away upon either side, so as to cause the water and slush to run to the gutters of the street, and thereby keep the conduit clean. The conduit structure may be formed in any suitable manner, though I prefer to make it of cast-iron yokes, supporting the slot-irons and adjacent rails of the two tracks and filled in with concrete or masonry. The outer rails may be tied to the yokes or their rails, and thus be prevented from spreading. I do not limit myself to the details set out in this specification, as they may be greatly modified without departing from the spirit of my invention.

Figure 1:
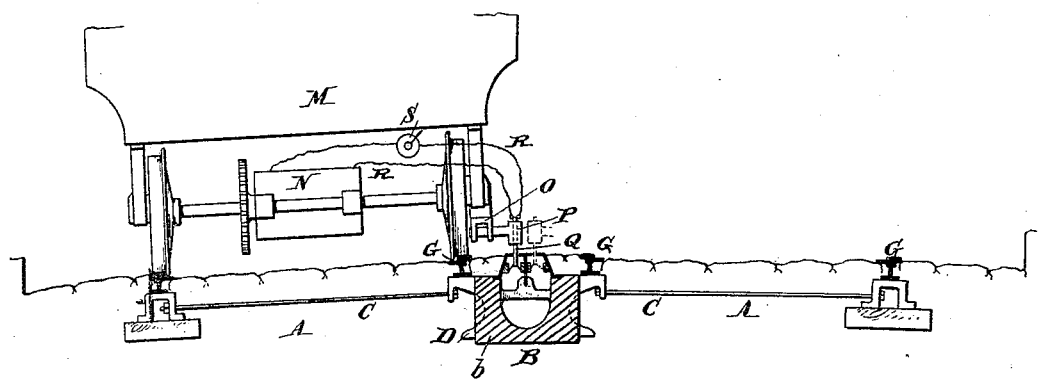
Figures 2, 3:
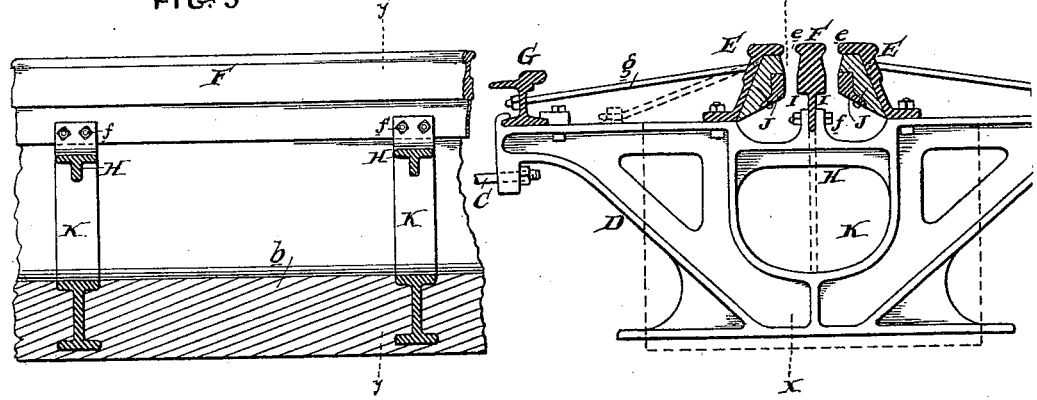
Figure 4:
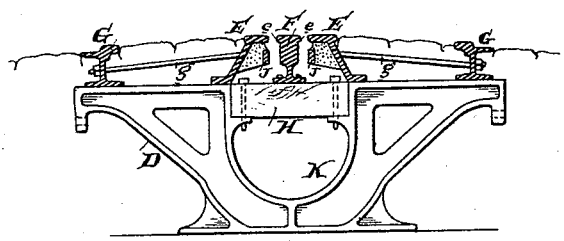
Figure 5:

In the drawings, Figure 1 is a cross-section of a two-track electric railway embodying my invention. Fig. 2 is a cross-section of the conduit. Fig. 3 is a longitudinal section of Fig. 2 on line $x\ x$. Fig. 4 is a cross-section of a modified form of conduit, and Fig. 5 is a detail of part of the slot-irons and attached conductors.

A A are the two tracks having the rails G. These tracks are separated a short distance and slope away to each side, so as to cause the rain-water and slush to run from their adjacent parts toward the gutters of the street.

B is a conduit of any suitable construction arranged between the adjacent rails of the two tracks. As shown, it is formed of cast-iron yokes D, which are more or less U-shaped, and support not only the slot-irons E E and F, but also support the adjacent rails G of the two tracks. The outer or more distant rails of the two tracks are tied to the conduit-yokes, and these to the inner rails by tie-rods C C.

The slot-irons E approach a central slot-iron of T shape supported on a cross-bracket H in the yokes, and are held in adjustment by being tied to the rails G, as shown at $g$, or to the yokes direct, as indicated in dotted lines in Fig. 2. The positive conductors J are supported by the slot-irons E, from which they are suitably insulated.

The conductors I are either made integral with the slot-iron F, as shown in Figs. 2 and 4, or electrically separate therefrom, as indicated in Fig. 5, in which L represents the insulation, and $i$ a rivet for uniting the conductors on each side of the slot-iron.

In Fig. 2 the slot-iron F and its conductors I are electrically connected with the yokes D and rails G, and the entire iron structure acts as the return to the central station.

In Fig. 4 the central slot-rail F and its conductors are insulated from the conduit and rails.

The conduit proper is formed of cement or concrete or masonry $b$, which extends from yoke to yoke and through and around them, forming a monolithic structure.

It is evident that the form of conduit shown has two upper compartments containing the electrical conductors and a single lower or drainage compartment common to both of the electrical or upper compartments. I however do not confine myself to this construction, as the conduit may be divided longitudinally, as indicated in dotted lines in Fig. 2, forming two drainage conduits or compartments. It is also clear that in place of a double conduit a single conduit may be employed upon the outside of the track-bed of the railway, and this conduit may have one or more conductors, and the rails may act as returns.

M represents the electrically-propelled car, having the propelling electric motor N, supported upon the axles. The collector Q, which extends down into the conduit through the slots thereof, is supported by the frame P free to move laterally in a guide O, secured to the axle-box or axle of the car and preferably independent of the car-body, which should be supported upon springs.

R is the motor-circuit, and S is the electric regulator. This collector is upon the outside of the car and on the side adjacent to the parallel track, which acts as the return-track for the car, and such collector is free to move laterally to compensate for any inequalities in the slot or their parallelism with respect to the track. This collector may be made in various ways; but in all cases the maximum distance between the outside of the collector and adjacent car-wheel must be less than the distance from the center of the conduit structure shown and the said car-wheel, so as to clear the collector carried by a car upon the other railway, which would be passing in an opposite direction. The motor-circuit R, connecting with the collector, is made flexible, so as to maintain connection with the collector during its lateral movement.

In this application I do not claim the upper and lower compartments nor the employment of yokes with slot-irons having the conductors arranged within the space bounded by the slot-irons, nor the arrangement of the conduit to the highest part of the road-bed, nor a conduit upon the outside of a road-bed, nor the collector carried by the axle-boxes and upon the outside of the wheel-base, as these features form subject-matter of my applications, Serial No. 277,311, dated June 16, 1888; Serial No. 285,295, dated September 13, 1888, and Serial No. 204,583, dated June 9, 1886.

Having now described my invention, what I claim as new, and desire to secure by Letters Patent, is—

1. The combination of a railway, a slotted conduit arranged to one side of the railway-track and outside of the rails thereof, a conductor arranged within the conduit, a traveling vehicle, an electric motor to propel the vehicle, a laterally-movable current-collecting device carried by the vehicle extending outside of its wheel-base and making a traveling connection with the conductor in the conduit, and a flexible circuit arranged between the motor and the current-collecting devices, whereby the collector may move laterally without interfering with the electric connection with the motor.

2. The combination of two railway-tracks, a slotted conduit for each track arranged between and parallel with them, a conductor in each conduit, an electrically-propelled vehicle, and a latterly-projecting current-collecting device carried by the vehicle outside of its wheel-base and extending into the slot of the conduit structure adjacent to the track upon which a vehicle is running and in which the distance from the outside of the collector to the adjacent wheel of the vehicle is less than the distance of a center line between the two slots of the conduit structures to the said wheel, whereby electrically-propelled vehicles upon the two railways may pass each other in opposite directions without the collecting devices coming in contact.

3. In an electric railway, the combination of a railway-track, a slotted conduit arranged parallel to the track and to one side thereof, a conductor arranged within the conduit, an electrically-propelled vehicle having a car-body supported on springs, an electric motor to propel the same supported upon the axles thereof, a current-collecting device extending laterally outside of the wheel-base of the vehicle and making a traveling connection with the conductor within the conduit and supported by the axles independently of the car-body, and electrical connections between the collector and motor.

4. In an electric railway, the combination of two railway-tracks and a conduit structure having two slots arranged parallel with and between the tracks, connecting devices for uniting two railways and conduit structures into an integral structure, whereby one portion thereof cannot shift laterally with respect to the other, and an insulated conductor arranged below each of the slots.

5. The combination of two railway-tracks, with a conduit arranged between them, having two slots and formed with a central division-iron acting as a continuous conductor, and an insulated conductor arranged below each of the slots and upon the side opposite to that formed by the continuous iron, whereby the conduit structure is provided with two insulated conductors, one for each slot, and a common conductor for both slots.

In testimony of which invention I hereunto set my hand.

RUDOLPH M. HUNTER.

Witnesses:
ERNEST HOWARD HUNTER,
E. M. BRECKINREED.